(12) United States Patent
Holleschau et al.

(10) Patent No.: US 12,199,419 B2
(45) Date of Patent: Jan. 14, 2025

(54) ELECTRICAL GANG BOX WITH DUAL MOUNTING STRUCTURES AND LOWER COMPARTMENT

(71) Applicant: Elemental LED, Inc., Reno, NV (US)

(72) Inventors: Randall Holleschau, Reno, NV (US); Matthew John, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/660,653

(22) Filed: May 10, 2024

(65) Prior Publication Data

US 2024/0291257 A1 Aug. 29, 2024

Related U.S. Application Data

(63) Continuation-in-part of application No. 18/299,034, filed on Apr. 11, 2023, which is a continuation of application No. PCT/US2021/015094, filed on Jan. 26, 2021, which is a continuation of application No. 17/087,327, filed on Nov. 2, 2020, now Pat. No. 10,938,194.

(51) Int. Cl.
| | |
|---|---|
| *H02G 3/20* | (2006.01) |
| *H02G 3/08* | (2006.01) |
| *H02G 3/38* | (2006.01) |
| *H05B 45/37* | (2020.01) |

(52) U.S. Cl.
CPC ............ *H02G 3/286* (2013.01); *H02G 3/083* (2013.01); *H05B 45/37* (2020.01)

(58) Field of Classification Search
None
See application file for complete search history.

(56) References Cited

U.S. PATENT DOCUMENTS 3,110,753 A * 11/1963 Witort ................. H02G 3/0616
138/116
3,690,501 A 9/1972 Ware
(Continued)

FOREIGN PATENT DOCUMENTS

| FR | 2786950 A1 | 6/2000 |
| WO | 2020219146 A1 | 10/2020 |

OTHER PUBLICATIONS

Elemental Led, Inc. "Switchex® Dimmer + Driver: Installation Guide." Version of Apr. 19, 2017.
(Continued)

*Primary Examiner* — Krystal Robinson
(74) *Attorney, Agent, or Firm* — Andrew McAleavey

(57) ABSTRACT

An electrical gang box adapted for use with drivers is disclosed. The electrical gang box includes a main compartment with a front opening sized and adapted to accept an electrical control and structure around the front opening to secure the electrical control within the front opening and within the main compartment. The electrical gang box also includes a lower compartment that extends below the main compartment, is set back from the front of the main compartment and is open to the main compartment along an upper portion. The gang box may also include one or more pairs of rails disposed on opposite interior walls. In such cases, a divider panel is sized to slide into and extend between the rails to divide the gang box. Multiple-gang boxes with these features are also disclosed.

21 Claims, 12 Drawing Sheets

(56) References Cited

U.S. PATENT DOCUMENTS

| | | | |
|---|---|---|---|
| 4,304,957 A | 12/1981 | Slater et al. | |
| 5,445,539 A | 8/1995 | Dale | |
| 5,486,650 A | 1/1996 | Yetter | |
| 5,594,207 A | 1/1997 | Fabian et al. | |
| 5,596,174 A * | 1/1997 | Sapienza | H02G 3/086 174/53 |
| 6,091,023 A * | 7/2000 | O'Donnell | H02G 3/086 174/57 |
| 6,414,241 B1 | 7/2002 | O'Donnell | |
| 6,576,835 B1 | 6/2003 | Ford et al. | |
| 7,141,736 B2 * | 11/2006 | Plankell | H02G 3/123 174/53 |
| 7,214,875 B1 | 5/2007 | Gretz | |
| 7,439,442 B2 | 10/2008 | Schutte | |
| 7,525,043 B1 * | 4/2009 | Gretz | H02G 3/126 174/64 |
| 7,905,621 B1 | 3/2011 | Hickman et al. | |
| 7,910,826 B1 | 3/2011 | Shotey et al. | |
| 8,446,737 B1 | 5/2013 | Tschirpke | |
| 8,826,630 B2 * | 9/2014 | Van Randen | E04B 2/14 52/239 |
| 8,975,518 B1 * | 3/2015 | Gretz | H02G 1/00 174/559 |
| 9,148,007 B2 | 9/2015 | Drane | |
| 9,531,177 B1 * | 12/2016 | Gretz | H01R 24/76 |
| 9,788,374 B1 * | 10/2017 | Holleschau | F21S 8/061 |
| 9,966,746 B1 | 5/2018 | Ediger et al. | |
| 10,128,646 B1 * | 11/2018 | Gretz | H02G 3/126 |
| 10,205,310 B1 * | 2/2019 | Gretz | H02G 3/085 |
| 10,389,096 B2 * | 8/2019 | Pistol | H02G 3/121 |
| 10,622,794 B1 * | 4/2020 | Holleschau | H05B 45/37 |
| 10,781,967 B1 * | 9/2020 | DeCosta | F16M 13/02 |
| 2002/0117317 A1 | 8/2002 | Archer et al. | |
| 2002/0134568 A1 * | 9/2002 | Dinh | H02G 3/088 174/50 |
| 2003/0056964 A1 * | 3/2003 | Lalancette | H02G 3/081 174/50 |
| 2009/0218128 A1 | 9/2009 | Carbone et al. | |
| 2012/0262006 A1 | 10/2012 | Elberbaum | |
| 2014/0090863 A1 | 4/2014 | Korcz et al. | |
| 2016/0359305 A1 | 12/2016 | Hemingway et al. | |
| 2018/0054050 A1 | 2/2018 | Thomas | |
| 2019/0058315 A1 | 2/2019 | Korcz et al. | |
| 2020/0203899 A1 | 6/2020 | Carter et al. | |
| 2020/0370750 A1 | 11/2020 | Hoagland et al. | |

OTHER PUBLICATIONS

International Search Report issued in International Patent Application No. PCT/US2021/015094, mailed Jul. 23, 2021.
Written Opinion issued in International Patent Application No. PCT/US2021/015094, mailed Jul. 23, 2021.

* cited by examiner

ELECTRICAL GANG BOX WITH DUAL MOUNTING STRUCTURES AND LOWER COMPARTMENT

CROSS-REFERENCE TO RELATED APPLICATIONS

This application is a continuation-in-part of U.S. patent application Ser. No. 18/299,034, filed Apr. 11, 2023, which is a continuation of PCT International Patent Application No. PCT/US2021/015094, which was filed on Jan. 26, 2021 and designated the United States of America. With respect to the United States of America, PCT/US2021/015094 is a continuation of U.S. application Ser. No. 17/087,327, filed on Nov. 2, 2020, now U.S. Pat. No. 10,938,194, issued Mar. 2, 2021. All of those applications are incorporated by reference herein in their entireties.

TECHNICAL FIELD

The invention relates to enclosures for electrical components, and in particular, to an electrical enclosure with a driver compartment.

BACKGROUND

A driver is a component that takes power in a first form and outputs power in a second form, different from the first. Ubiquitous in modern consumer electronics, drivers are most frequently used to convert high-voltage, alternating-current (AC) power to low-voltage, direct-current (DC) power, although AC-to-AC, DC-to-DC, and other forms of power conversion are also sometimes seen. The switched-mode power supply is one common type of driver used for AC-to-DC power conversion, but other types of drivers are also used.

Drivers are unloved. Referred to derisively as bricks, wall worts, and worse, they can be inconvenient to install and to use. For example, during the installation of a low-voltage DC electrical product like linear lighting, the installer must plan out how much power each part of the system requires, find compatible drivers, and provide space to install those drivers at appropriate locations. Installers are required to be ever more creative with their placement of drivers, and if the power utilization calculations for the system are off, the installer may need to remove and replace the drivers with different models, at significant expense. Drivers also frequently fail, and replacement after installation may mean tearing holes in drywall, opening barely-accessible raceways and compartments, or otherwise undoing whatever creative contortions the installer went through to install the drivers in the first place.

In many installations, it would be logical to place a driver in the same enclosure in which typical electrical control elements are placed. In typical household and commercial construction, control elements like switches and dimmers are placed in electrical enclosures called gang boxes. These gang boxes are usually nailed, screwed, or otherwise secured to the joists or other support beams of the structure and are then covered by drywall (i.e., gypsum board) or other such wall sheathing. There are two main problems with placing a driver in a gang box: first, finding space in a typical gang box for a driver is difficult, and, second, electrical codes and regulations may require high-voltage circuits to be separated from low-voltage circuits, which adds a degree of complexity.

The present assignee has put forward several solutions to the problem of placing a driver in a gang box. U.S. Pat. No. 9,788,374 uses a gang box with multiple compartments and places the switch or dimmer in one compartment and the driver in another compartment, using dividers as necessary. The driver is usually covered with either a blank or a dummy fascial plate. Although the solution put forward by this patent uses off-the-shelf components, a multiple-gang box requires more space, using a compartment for the driver may take up space needed for a switch or dimmer, and a blank plate or a dummy control may confuse the end user.

U.S. Pat. No. 10,622,794 proposes a different solution: providing holes or knock-outs in a traditional gang box that would allow a driver to be "hung" from the gang box in various places. While this conserves space by, essentially, placing the driver in unused space below or behind the gang box, it does have some shortcomings. First, with the arrangement proposed by this patent, special mounting brackets and specially adapted drivers are used, which adds complexity. Additionally, as electrical enclosures, one of the main practical purposes of gang boxes is to provide fire protection— i.e., to contain sparks and flame in case of electrical arcing, a short, or another such situation. Because the driver is hung from the gang box, and is thus not enclosed, the gang box may not be able to provide sufficient fire protection to meet regulatory requirements.

BRIEF SUMMARY

One aspect of the invention relates to an electrical gang box adapted for use with drivers. The electrical gang box includes a main compartment with a front opening sized and adapted to accept an electrical control and structure around the front opening to secure the electrical control within the front opening and within the main compartment. The electrical gang box also includes a lower compartment that extends below the main compartment, is set back from the front of the main compartment and is open to the main compartment along an upper portion. The gang box may also include one or more pairs of rails disposed on opposite interior walls. In such cases, a divider panel is sized to slide into and extend between the rails to divide the gang box. Several pairs of rails may be provided to allow for alternative positions for the divider panel. The divider panel itself may have a number of frangible score lines, dividing it into sections which can be broken off to adjust for the depth of the electrical control.

The gang box typically has one or more openings, or potential openings, to allow for the passage of wires and cables into and out of the gang box. In some embodiments, the potential openings may be flaps that deflect to allow passage of wires and cables, but provide strain relief for those wires and cables.

Another aspect of the invention relates to multi-gang boxes. These multi-gang boxes have several compartments for electrical controls. In embodiments according to this aspect of the invention, the main portion of the gang box is divided by vertically-extending dividers into two or more main compartments, each of the two or more main compartments sized to accept a standard electrical control. These multi-gang boxes also include a lower portion. The dividers may extend down into the lower portion to divide the lower portion into multiple corresponding lower compartments as well, or the lower portion may remain undivided, extending across several of the two or more main compartments. Each of the main compartments has the features described above, including rails and a horizontally-extending divider panel that can be used to separate high-voltage circuits and connections from low-voltage circuits and connections.

Yet another aspect of the invention relates to an electrical gang box. The electrical gang box has a main compartment and a lower compartment. The main compartment has a front, a back, and a rectilinear front opening at the front, and is sized and adapted to accept an electrical control. The lower compartment extends below and depends from the main compartment. Dimensionally, the lower compartment has contiguous sidewalls with the main compartment and a lesser depth than the main compartment, such that the lower compartment is set back from the front of the main compartment. The lower compartment is open to the main compartment along at least substantially the entirety of an upper extent thereof. Additionally, the gang box has both paddle structure coupled to an outer portion of the main compartment; and hole-guides positioned within the main compartment. The paddle structure is rotatably coupled to at least one outer portion of the main compartment so as to be rotated between stowed and deployed positions. The paddle structure may comprise a first paddle structure positioned at an upper exterior corner of the main compartment and a second paddle structure positioned at a lower exterior corner of the main compartment, which may be opposite corners.

The gang box may also include a wire ingress opening and a wire egress opening spaced from one another at respective sides of a top of the main compartment. To divide the main compartment into high- and low-voltage compartments, a horizontal divider removably insertable into sets of vertically-aligned slots along opposite interior sidewalls of the main compartment, and a vertical divider carried, at least in part, by the horizontal divider and extending from the horizontal divider to an interior top surface of the main compartment, may be included. At least a portion of each divider may be divided into sections by frangible break lines.

A further aspect of the invention relates to gang boxes that are adapted to be used for both new construction and retrofits, or in the parlance of the industry, both "new work" and "old work." Gang boxes according to this embodiment have both paddle structure coupled to an outer portion of the gang box and guide-holes positioned along the sides of the gang box. The guide-holes allow fasteners to be inserted through the sides of the gang box and into an adjacent joist or other member for new work. The paddle structure allows the gang box to be supported in an opening cut in an outer wall surface.

For example, a gang box according to this aspect of the invention may include a main compartment having a front, a back, and a rectilinear front opening at the front. The main compartment is sized and adapted to accept an electrical control. Paddle structure is coupled to an outer portion of the main compartment, and hole-guides positioned within the main compartment.

The gang box according to this aspect of the invention may include a lower compartment. The lower compartment extends below and depends from the main compartment, and has contiguous sidewalls with the main compartment and a lesser depth than the main compartment, such that the lower compartment is set back from the front of the main compartment. The lower compartment is open to the main compartment along at least substantially the entirety of an upper extent thereof.

Another further embodiment of the invention also relates to a gang box. In addition to a main compartment and a lower compartment as described above, the gang box comprises a horizontal divider removably insertable into sets of vertically-aligned slots along opposite interior sidewalls of the main compartment, and a vertical divider carried, at least in part, by the horizontal divider and extending from the horizontal divider to an interior top surface of the main compartment. The horizontal divider and the vertical divider may be divided into sections by frangible lines, allowing the depths of the dividers to be adjusted by breaking off one or more sections. A gang box according to this aspect of the invention may also include both the paddle structure and the guide-holes described above.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
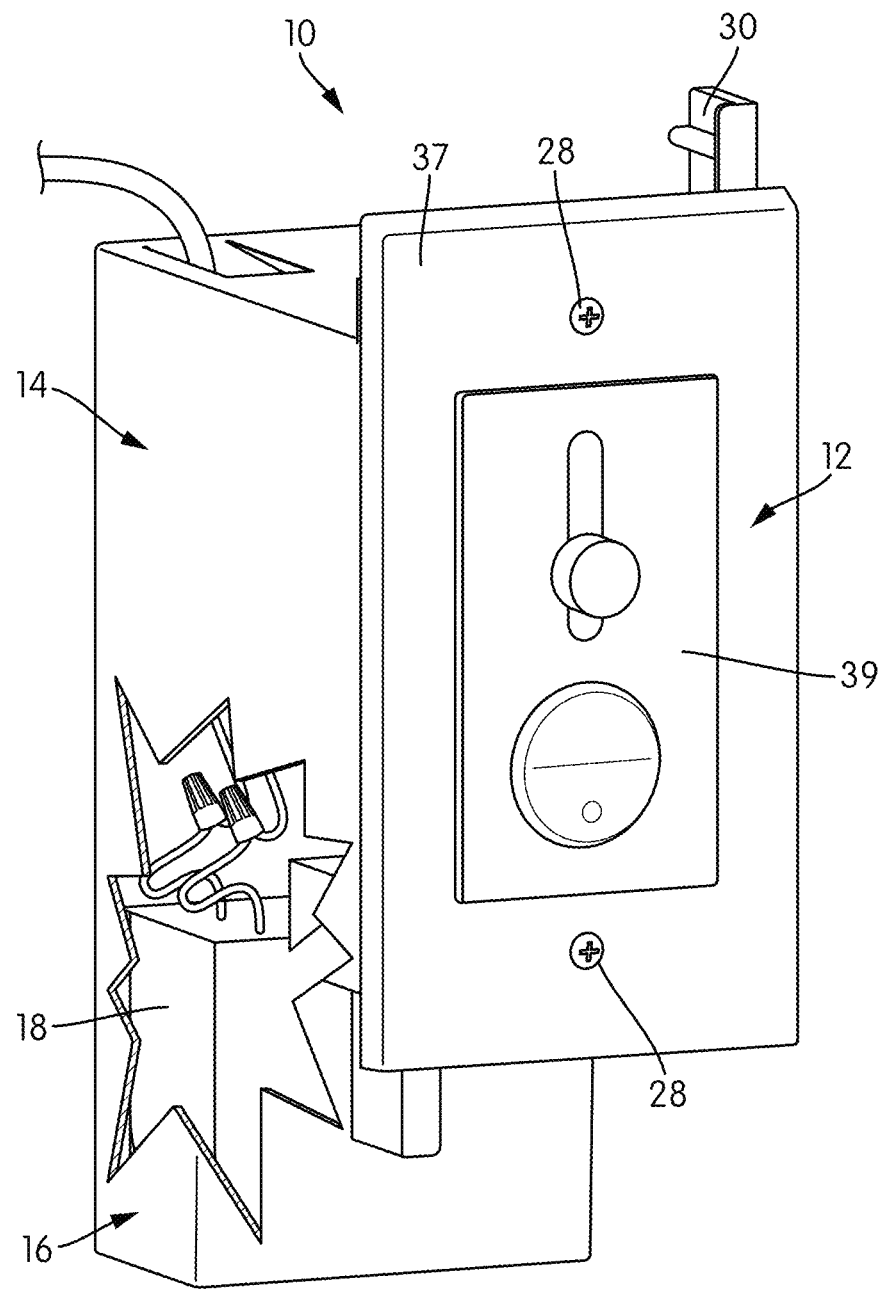
FIG. 1 is a perspective view of a gang box according to one embodiment of the invention, shown assembled with an electrical control.

FIG. 1 is a perspective view of a gang box, generally indicated at 10, according to one embodiment of the invention. The gang box 10 is shown with an electrical control 12 installed in its main compartment 14. The gang box 10 also has a driver compartment 16, which, in this case, lies below and depends from the main compartment 14 and, as shown, has a driver 18 installed in it.

As those of skill in the art will understand, while this description uses the term "gang box" to describe the embodiment of FIG. 1, the gang box 10 may also be referred to as a "one-gang box" or as a "junction box." This specification uses the terms "gang box" and "junction box" synonymously.

The gang box 10 shares at least some of the features of a typical electrical gang box, in that it is an enclosure with a front opening. As can be seen in FIG. 1 and in FIG. 2, a similar perspective view with the electrical control 12 removed, the gang box 10 has structure typical of a standard gang box that allows it to be attached to joists and other such structure. In the illustrated embodiment, this includes pairs of upper and lower flanges 20 along the front of the gang box 10, around the opening 22 to the main compartment 14. Each of the upper and lower flanges 20 carries a fastener hole 24. Set closer to the front opening 22 and located along the vertical centerline of the opening 22 are a pair of upper and lower receptacles 26 that, as can be seen best in FIG. 1, are adapted to receive a fastener 28 to secure the electrical control 12 within the main compartment 14 of the gang box 10. Additionally, there is a paddle 30 in the illustrated embodiment that allows the gang box 10 to grip the reverse side of a sheet of drywall. Of course, these features may vary from embodiment to embodiment; generally speaking, the gang box 10 may be installed anywhere, and may have any features that enable it to be installed anywhere. In particular, gang boxes 10 according to embodiments of the invention may be designed in two varieties: one for installation during new construction, and a second version for retrofitting. Some features, like the paddle 30, work best in retrofit versions, while other features work best or are most common in new-construction versions.

Figure 2:
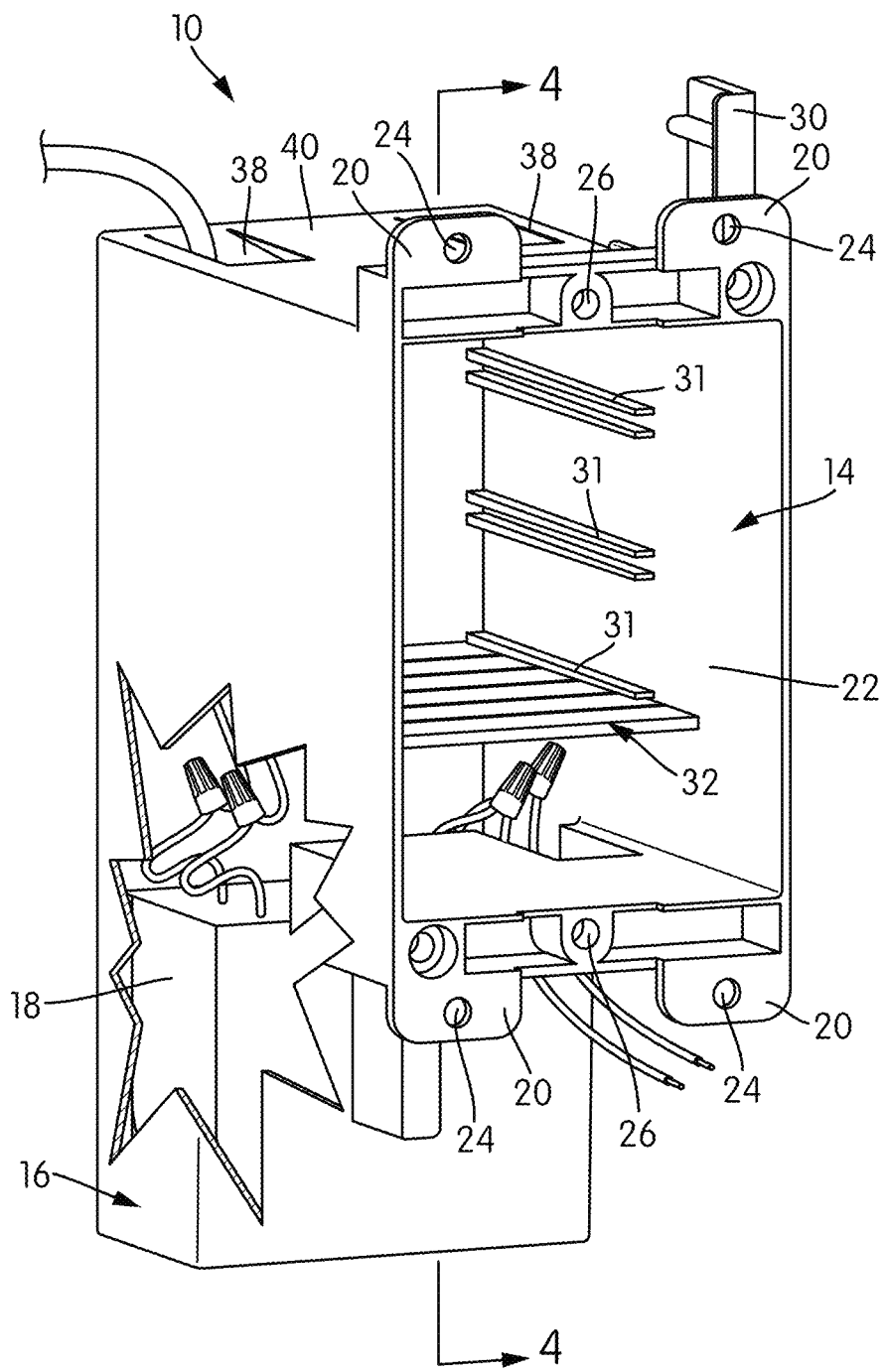
FIG. 2 is a perspective view of the gang box of FIG. 1 with the electrical control removed.
Figure 3:
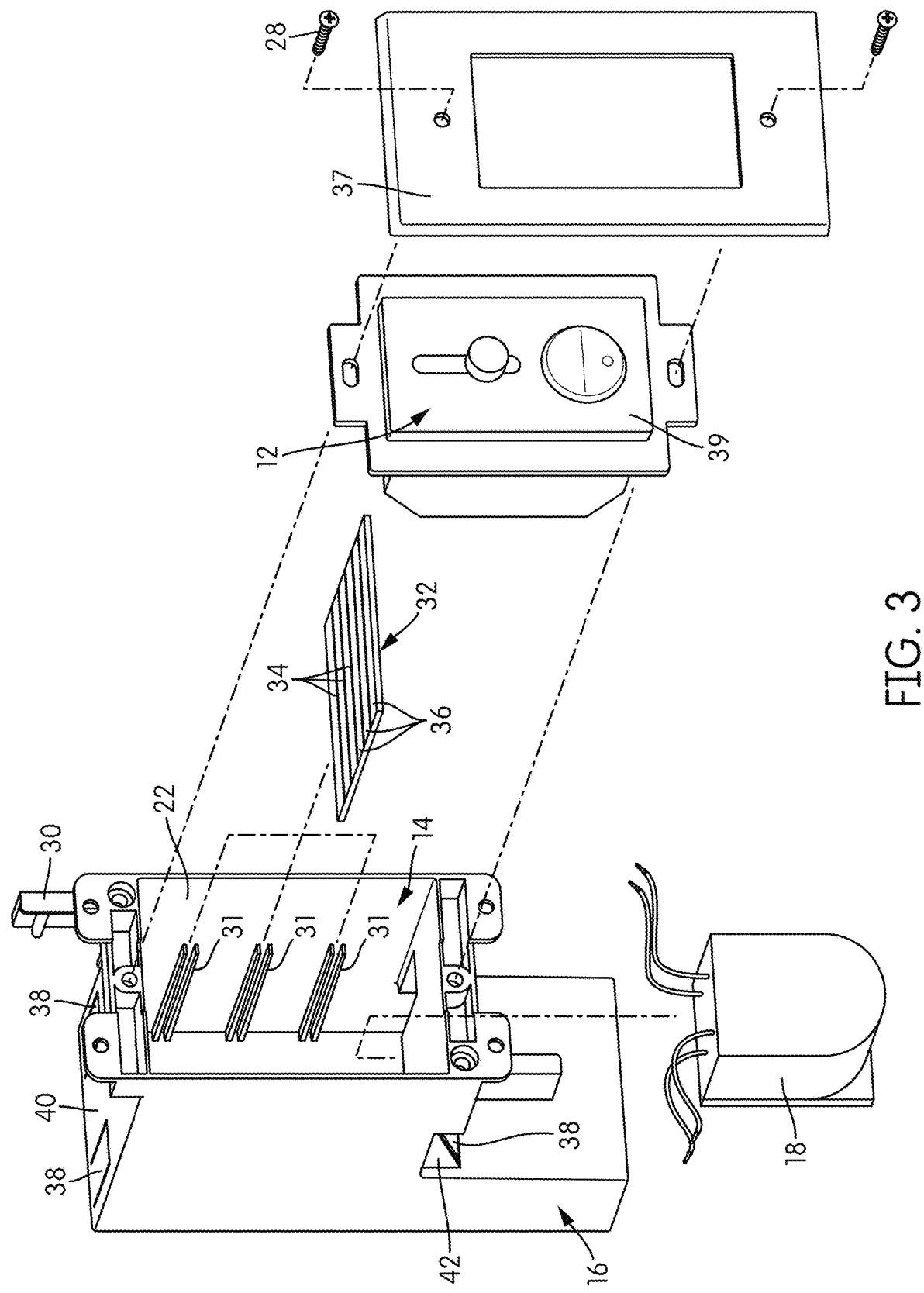
FIG. 3 is an exploded perspective view of the gang box of FIG. 1.

FIG. 3 is an exploded perspective view of the gang box 10. As shown in FIGS. 2 and 3, the main compartment 14 has the size and other characteristics to accept a standard-sized electrical control 12. The term "electrical control," as used here, should be read broadly to encompass any element that may be placed in a gang box 10, including switches, dimmers, and other such elements. Typically, but not always, these components will take high-voltage AC power as input and output a high-voltage AC power signal. (While the definitions of "high voltage" and low voltage" vary according to the authority one consults, for purposes of this description, high voltage should be considered to be any voltage over 50V.) In these sorts of arrangements, some further element is typically necessary to provide an appropriate power or control signal for low-voltage linear lighting and other such low-voltage products found in a home or business. In this description, that further element is referred to as a driver 18, although in some embodiments or installations, the further element may be something else, such as a color controller, a network interface, or some other element. Thus the term "driver," as used here, should be read broadly to encompass other elements that may be placed in a gang box 10 but that are not, strictly speaking, drivers.

The main compartment 14 may vary in depth, and gang boxes 10 with deeper and shallower compartments may be made. In addition to the usual features of a gang box, the main compartment 14 has a series of rails 31. In the illustrated embodiment, there are three sets of rails on each of the left and right sidewalls of the main compartment 14, positioned so as to align with and oppose one another. In other embodiments, there may be any number of sets of rails 31, spaced from one another along the walls. The rails 31 define insertion positions for a divider 32 that slides horizontally into the rails 31 behind the electrical control 12, dividing the main compartment 14 vertically into an upper portion and a lower portion.

As was described briefly above, regulatory requirements or the desire for additional protection against sparks, electrical arcs, and other such potential issues may make it desirable to separate high-voltage connections from low-voltage connections. If so, the divider 32 may be used to provide the necessary division. The divider 32 has a number of frangible lines 34 that allow strips 36 to be broken off of the divider 32 to adjust its depth, so that it does not interfere with the electrical control 12. In other words, if the electrical control 12 is relatively shallow and does not extend far into the gang box 10, the divider 32 may be used at its full depth. On the other hand, if the electrical control 12 has significant depth, it may be necessary to break off one or more of the strips 36 in order to fit everything.

In the illustrated embodiment, the driver compartment 16 is located below the main compartment 14, set somewhat back from its main opening 22. While the exact positioning of the driver compartment 16 may vary somewhat from embodiment to embodiment, it is helpful if the positioning of the driver compartment 16 allows drywall or other such wall finishing elements to be installed over the gang box 10 as usual. In this embodiment, the width of the driver compartment 16 matches the width of the main compartment 14, such that the sidewalls of the main compartment 14 are contiguous with the sidewalls of the driver compartment 16, although that need not be the case in all embodiments. The depth of the driver compartment 16 is about one-third of the depth of the main compartment 14, and the height of the driver compartment 16 is about three-quarters of the height of the main compartment 14, although these proportions may vary considerably from embodiment to embodiment.

The driver compartment 16 is open to the main compartment 14 along its upper extent, such that, in many cases, the driver 18 can simply be dropped into the driver compartment 16 and held there by the force of gravity, as shown in FIG. 3. With the driver 18 in that position, connections may be made in the main compartment 14, in the driver compartment 16, or in both.

As FIG. 3 also illustrates, to complete the assembly, a traditional switch plate 37 rests over the electrical control 12 and is secured to the gang box 10 with a fastener 28, typically a machine screw, as described above. In the illustrated embodiment, the electrical control 12 has fascial plate 39 with controls that are operable by a user after installation. The color and other aesthetic characteristics of the fascial plate 39 would typically match those of the switch plate 37.

The manner of making connections between the electrical control 12 and the driver 18 will vary depending on the nature of the electrical control 12 and the driver 18, the connections provided by the electrical control 12 and the driver 18, and the applicable safety or regulatory requirements. In many cases, both the electrical control 12 and the driver 18 will have input and output wires protruding from their cases. In that case, connections with other conductors may be made with traditional electrical connection devices, such as wire nuts or lever nuts.

The gang box 10 typically has some sort of openings or potential openings to permit the passage of cables and wires into and out of the gang box 10. In some embodiments, those openings may be created by knock-outs, i.e., scored, frangible portions of plastic or metal that can be broken away, either manually or with a tool, to create an opening. However, the illustrated embodiment takes a slightly different approach, using sets of fold-out flaps 38, two flaps 38 on the upper face 40 of the gang box 10, and two flaps 38 on an angled facet 42 near the junction between the main compartment 14 and the driver compartment 16. These flaps 38 are rectilinear, free on three sides and connected to the rest of the gang box 10 on the remaining side. In some cases, three sides may be scored, frangible lines, and the flaps 38 may be broken out in same way as knock-outs. The advantage of fold-out flaps 38 can be seen in FIGS. 1 and 2: the flaps 38 act as strain relief for incoming and outgoing wires and cables 44, 46, partially capturing them as they pass through the gang box 10. The wires, cables, and other conductors used with the gang box 10 may be of any type customarily used. For example, in many in-wall applications, Type NM cable may be suitable.

Figure 4:
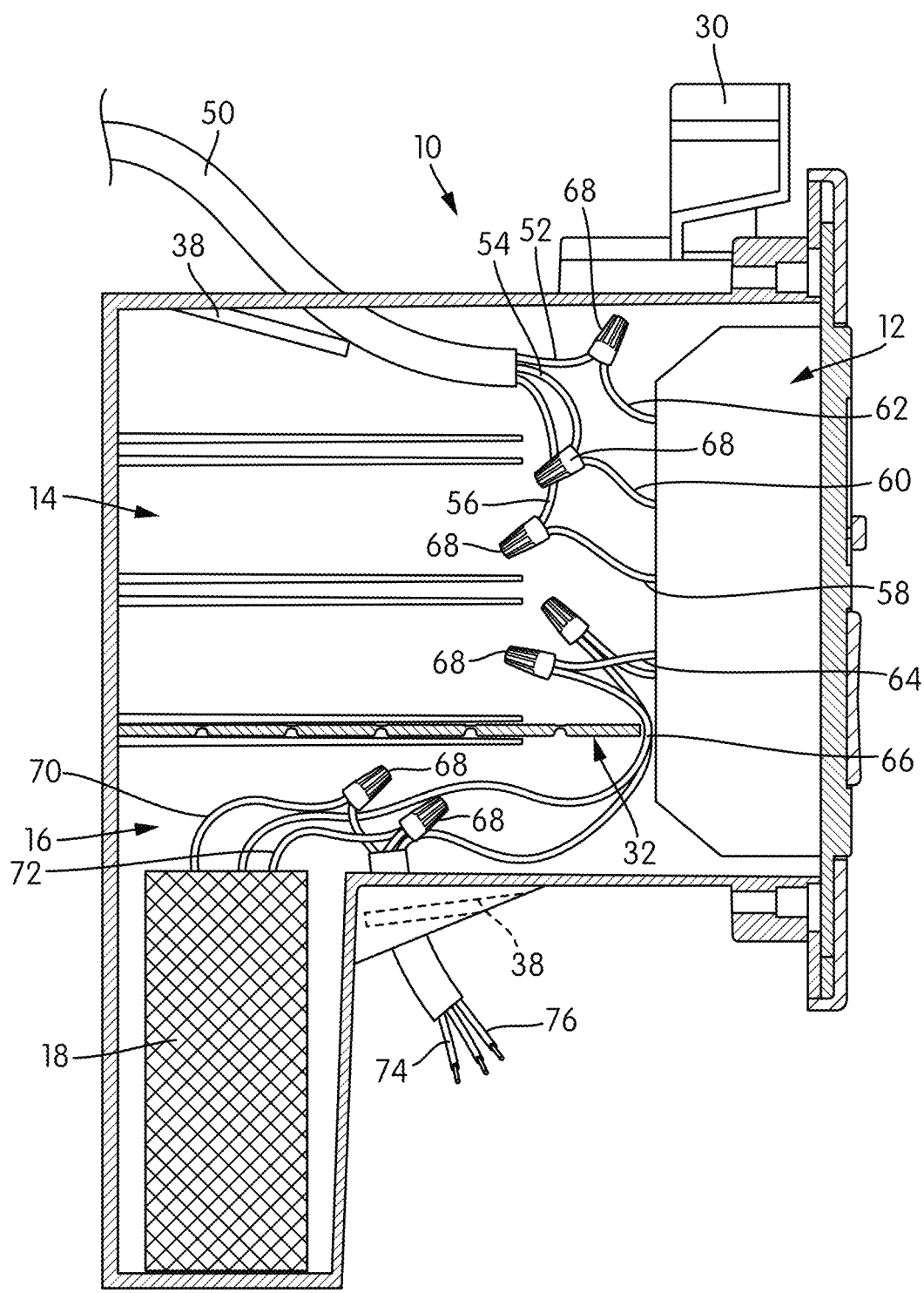
FIG. 4 is a cross-sectional view, taken through Line 4-4 of FIG. 1.

FIG. 4 is a cross-sectional view taken through Line 4-4 of FIG. 2, illustrating a typical way in which connections may be made within the gang box 10. In FIG. 4, a high-voltage cable 50 enters the gang box 10 through one of the flaps 38 in its upper wall. A typical high-voltage cable 50 includes three conductors 52, 54, 56, usually arranged as line, neutral, and ground. In the upper portion of the main compartment 14, divided by the divider 32, these three conductors 52, 54, 56 from the cable 50 are connected to respective input conductors 58, 60, 62 from the case of the electrical control 12. In the same upper portion of the main compartment 14, high-voltage output wires 64 from the electrical control 12 are connected to high-voltage input wires 66 from the driver 18. In the view of FIG. 4, only one of the output-input wire sets 64, 66 is shown for the sake of simplicity; typically, there would be two or three sets. In the illustration of FIG. 4, all of the connections between wires are made with wire nuts 68, although other connecting elements may be used. Low voltage DC output wires 70, 72 from the driver 18 are connected to wires 74, 76 that exit the gang box 10 through one of the lower flaps 38. Of course, the low-voltage wires 70, 72 may also be part of a cable.

Of course, the illustration of FIG. 4 is only one possible way in which the electrical control 12 may be connected to the driver 18, and assumes that the electrical control 12 works with high-voltage AC and the driver 18 converts from high-voltage AC to low-voltage DC. In fact, there may be installations in which the driver 18 in the driver compartment 16 and the electrical control 12 are not electrically connected to one another. That is, there may be situations in which an installer may wish to place a driver 18 in the driver compartment 16 merely as a matter of placement, without needing to connect the driver 18 and the electrical control 12.

FIGS. 1-4 illustrate what would be referred to in the industry as a single-gang box. Multiple-gang boxes may also be made in accordance with embodiments of the invention. Generally speaking, multiple-gang boxes have multiple compartments for individual electrical controls 12. They are particularly useful when a bank or strip of electrical controls are to be located next to one another. The most common multiple-gang boxes are so-called two-gang (i.e., two compartment) and three-gang (i.e., three compartment) boxes, although four-gang and five-gang boxes may also be made.

Figure 5:
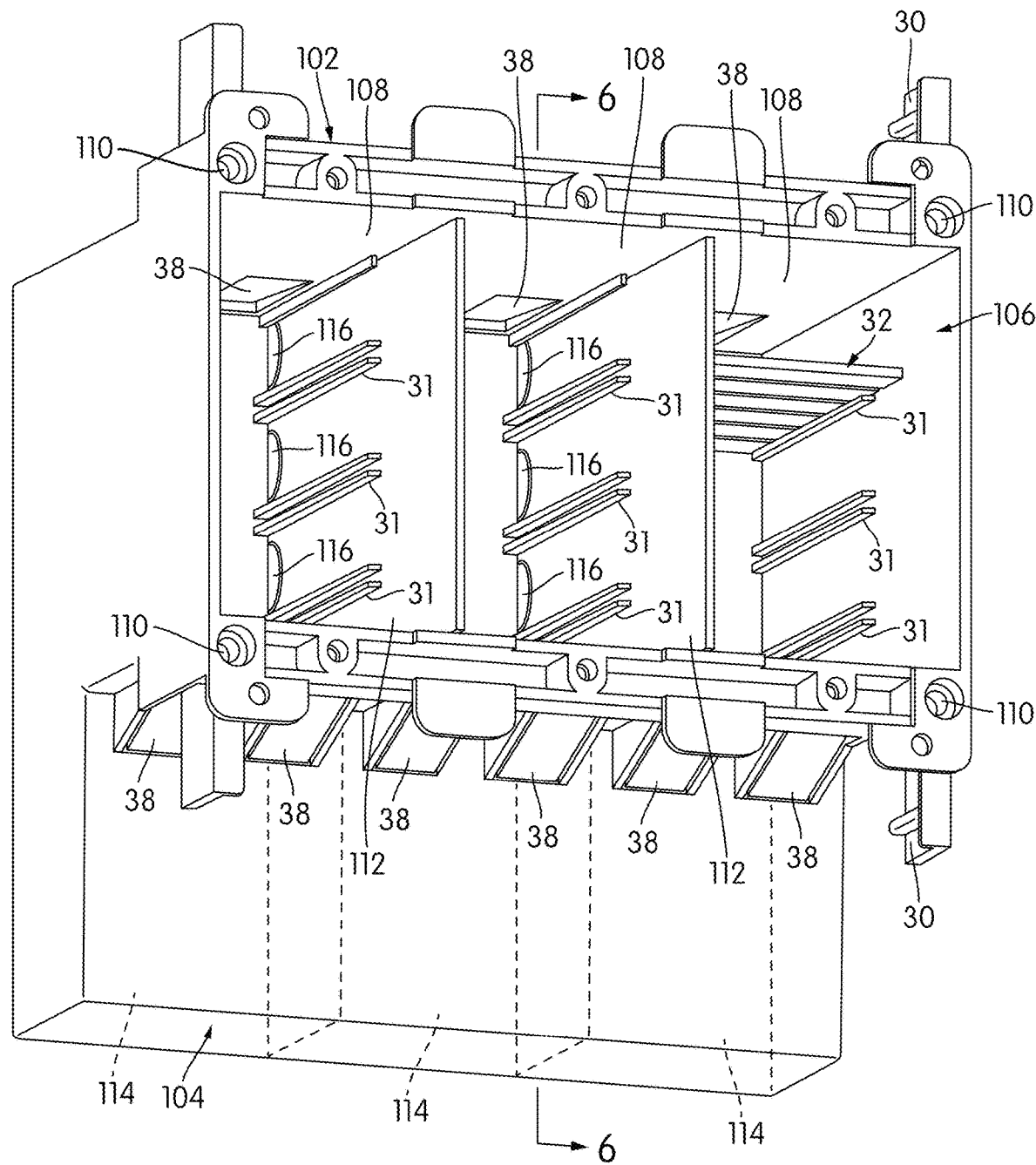
FIG. 5 is a perspective view of a multiple-gang box according to another embodiment of the invention.

FIG. 5 is a perspective view of a three-gang box, generally indicated at 100, according to another embodiment of the invention. The three-gang box 100 is intended to be a representative example of multiple-gang boxes, and in general, multiple gang boxes with more or fewer than three compartments would be constructed in substantially the same way.

The three-gang box 100 has a main portion 102 and a driver portion 104. As with the gang box 10 described above, the driver portion 104 is below and depends from the main portion 102. The main portion 102 has a large front opening 106 that is divided into three compartments 108, as will be described below in more detail. Around the front opening 106 and the top and bottom walls of the main portion 102, the three-gang box 100 carries mounting structure to secure it to joists and other such structures. For example, each corner around the front opening 106 has a fastener hole 110. The structures of the multiple-gang box 100 are the same or substantially the same as those described above with respect to the gang box 10; thus, features not described specifically here may be assumed to be the same or substantially the same as those described above.

The three-gang box 100 has two vertical internal dividers 112 positioned within the main portion 102 to divide the main portion 102 into the three compartments 108. As is traditional in gang boxes, the three compartments 108 have equal sizes in the three gang box 100; however, that need not be the case in all embodiments. In the illustrated embodiment, the internal dividers 112 continue down into the driver portion 104, dividing the driver portion 104 into three compartments 114 of equal size. Each of the compartments 114 in the driver portion 104 corresponds with one of the compartments 108 in the main portion 102. However, in some cases, the driver portion 104 may be undivided, forming one long trough for drivers.

As with the gang box 10, each of the compartments 108 can be divided vertically by a horizontally-extending divider 32 in order to isolate high-voltage circuits from low-voltage circuits, as described above. The side walls of each compartment 108 carry multiple sets of rails 31, spaced from one another, to receive the divider 32. Specifically, as can be seen in FIG. 5, the dividers 112 each carry multiple, vertically-spaced sets of rails 31 on each side.

The multiple-gang box 100 has fold-in flaps 38 or other ingress-egress structures in the same relative positions as in the gang box 10 described above, positioned at the top and bottom of each compartment 108. These flaps 38 allow wires and cables to enter and leave the multiple-gang box 100. However, the multiple-gang box 100 also includes additional structure for allowing wires and cables to transit from one compartment to another.

Figure 6:
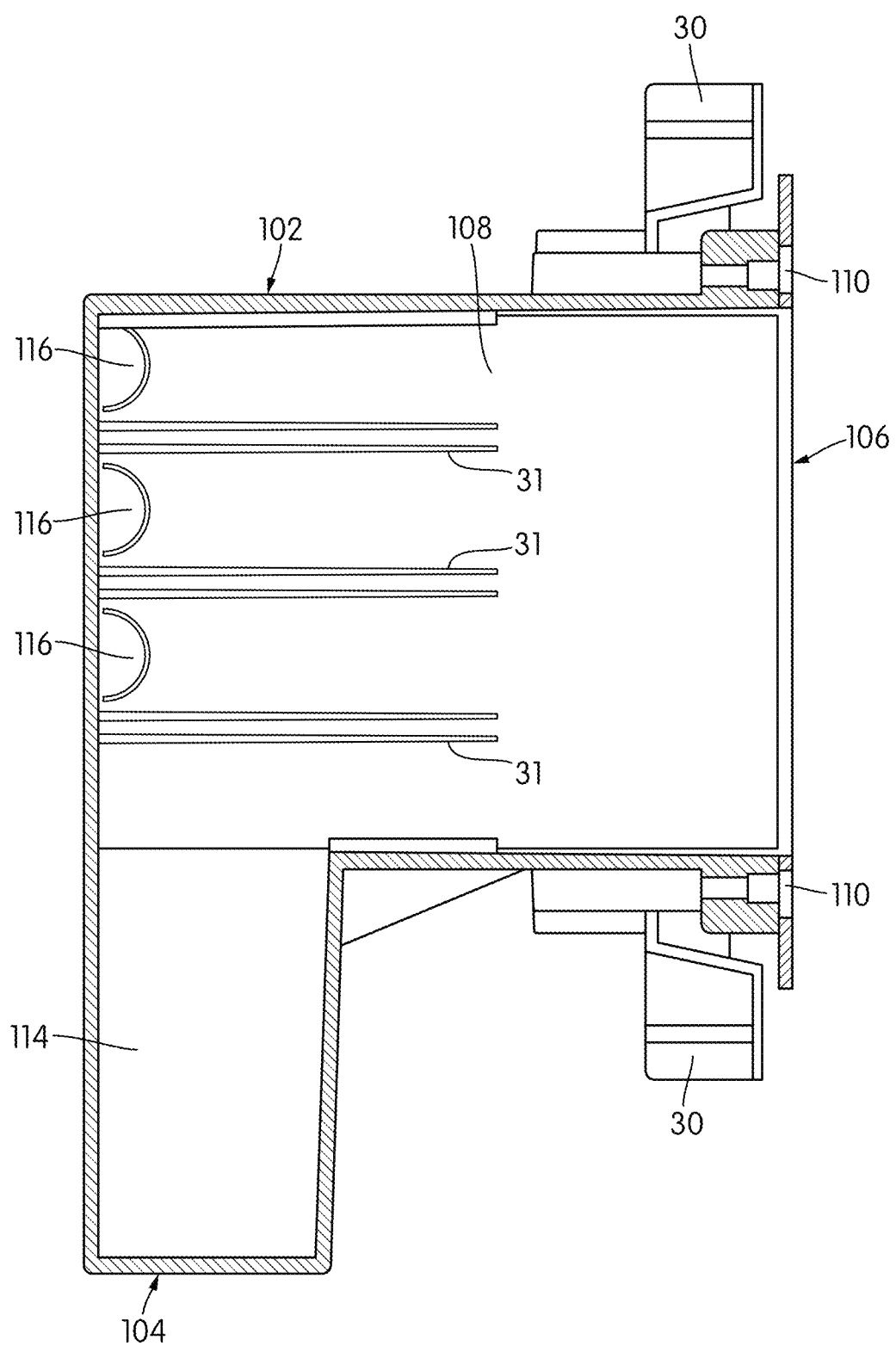
FIG. 6 is a cross-sectional view taken through Line 6-6 of FIG. 5.

More specifically, in a typical installation, a single high-voltage cable is brought into a multiple-gang box. Connections to that single cable are made within the multiple-gang box, and high-voltage power is thus distributed to all of the compartments from a single point of ingress. For that reason, as shown in FIG. 5 as well as in FIG. 6, a sectional view taken through Line 6-6 of FIG. 5, each of the dividers 112 has a set of tabs 116 that allow transit of wires or cables from one compartment 108 to the next. These tabs 116, which are in the rear of each divider 112, where the divider 112 meets the rear wall of the main portion 102, may be either knock-outs or flaps. In the illustrated embodiment, the tabs 116 are semicircular flaps.

As with the gang box 10 described above, the gang box 100 may be made in versions suitable for either retrofit or new construction, and with any kind of securing structure. The gang box 100 is a retrofit version and thus carries the paddles 30 described above.

Figure 7:
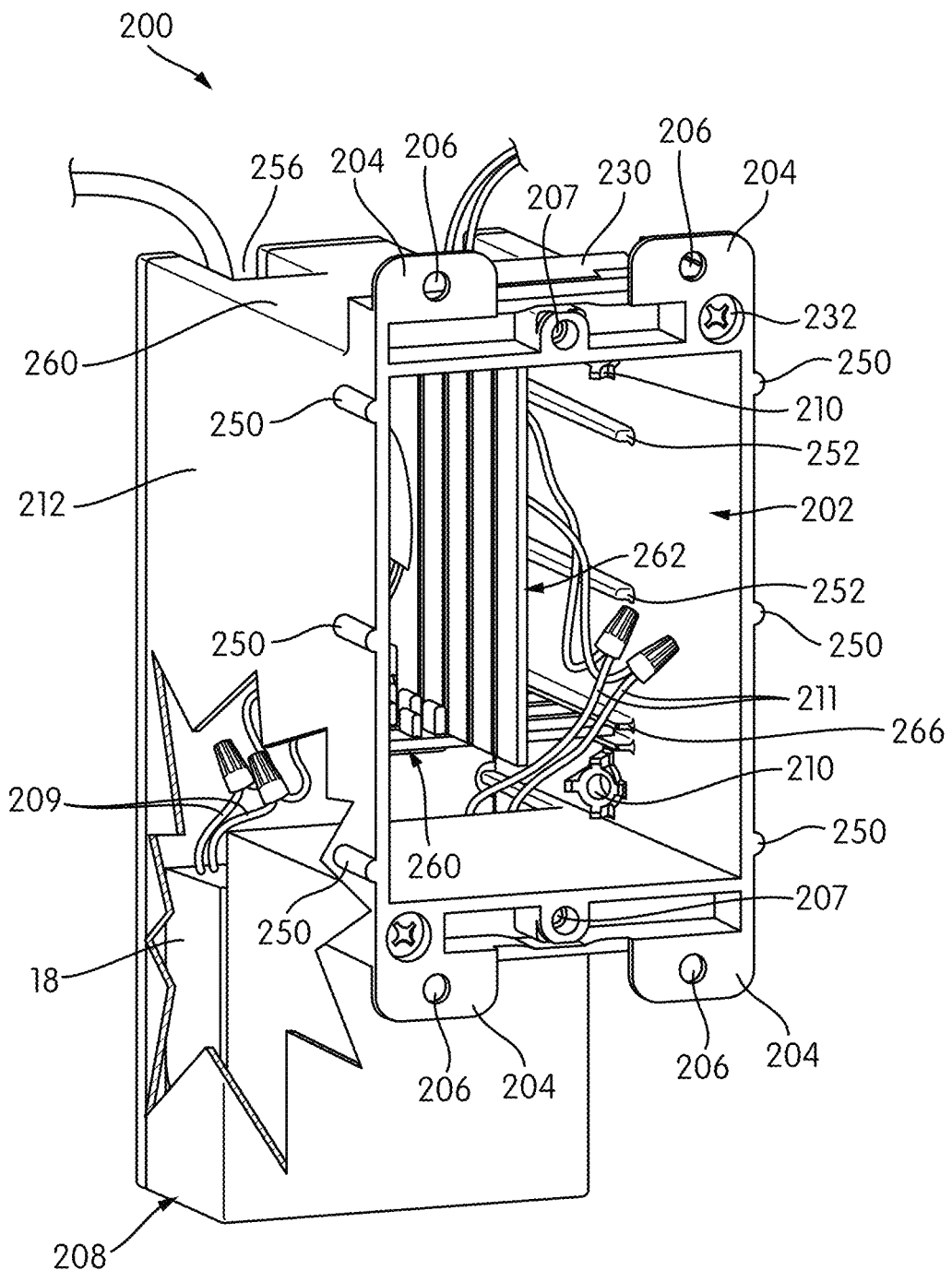
FIG. 7 is a perspective view of a gang box according to another embodiment of the invention.

As described above, the gang boxes 10, 100 can be made in versions suitable for either retrofit or new construction (sometimes called "old work" and "new work" gang or gang boxes). However, it is possible to make a single gang box suitable for both retrofit and new construction. FIG. 7 is a perspective view of such a gang box, generally indicated at 200. The gang box 200 is one-gang box (or junction box) with a main compartment 202 sized to carry a standard switch or control.

As with the gang box 10 described above, around the front opening of the main compartment 202, the gang box 200 has upper and lower flanges 204 with standard fastener openings 206 to secure the switch or control within the main compartment 202 and to secure a cover plate to the front of the main compartment 202. Threaded fastener openings 207 centered just above and below the main compartment 202 are provided to secure a face plate or other fascial element either over the main compartment 202 or over and around an electrical control placed in the main compartment 202.

The gang box 200 also has a lower compartment 208 that serves as a lower compartment 208. As can be appreciated from FIG. 7, the sidewalls of the main compartment 202 are contiguous with the sidewalls of the lower compartment 208, and in the illustrated embodiment, the sidewalls are straight, giving the lower compartment 208 the same width as the main compartment 202 of the gang box 200. Like in the gang box 10 described above, the main compartment 202 is internally open to the lower compartment 208, with the lower compartment 208 set back from the front of the main compartment 202, such that the lower compartment 208 in this embodiment is a fraction of the depth of the main compartment 202, and the opening between the main compartment 202 and the lower compartment 208 is located internally toward the bottom rear of the main compartment. The precise dimensions of the lower compartment 208 will depend on the particular embodiment and the size of the driver 18 that is placed in it. The lower compartment 208 may be, e.g., two-thirds, one-half, one-third, or one-quarter the depth of the main compartment 202.

In FIG. 7, the lower sidewall of the gang box 200 is broken away to show the driver 18 connected in the lower compartment 208. In the illustrated embodiment, the driver 18 is not specially secured within the lower compartment 208; rather, it simply rests there. However, in other embodiments, the driver 18 may be fastened in place within the lower compartment 208 by adhesives, threaded fasteners, straps, or similar means. For ease in description, the driver 18 here is assumed to be the driver 18 described above, although that need not be the case. The type and specific features of the driver 18 are not critical, although it is assumed in this description that the driver has a set of wires 209 that connect to high-voltage input wires, and a set of wires 211 that connect to a low-voltage output. In the illustration of FIG. 7, the connecting wires 209, 211 each protrude from the same upper surface of the driver 18; however, that is not necessary in all embodiments.

Figure 8:
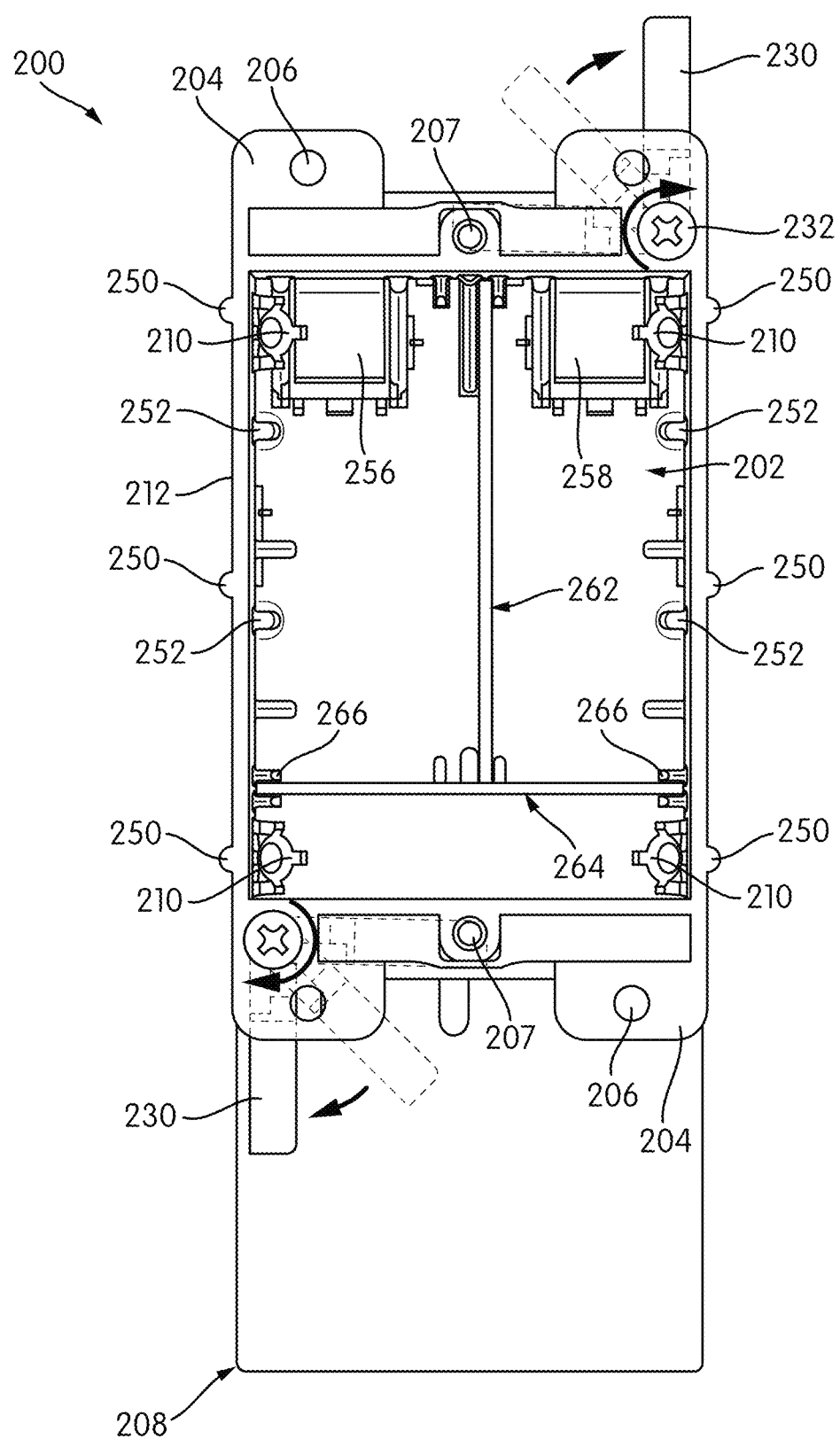
FIG. 8 is a front elevational view of the gang box of FIG. 7.

As was alluded to above, the gang box 200 has structures that allow it to be used in either retrofits or in new construction (i.e., in industry parlance, it may be used for either "old work" or "new work"). Typically, a gang box designed for use in new construction would have structure designed to allow the installer to drive a screw or nail generally laterally, into an adjacent joist. FIG. 8 is a front elevational view of the gang box 200. As shown in FIG. 8, the gang box has sets of hole-guides 210 along each side of the main compartment 202. In the illustrated embodiment, there are two hole-guides 210 along each internal sidewall of the main compartment 202, aligned and spaced vertically from one another. Each hole-guide 210 is a raised, angularly-canted opening or knock-out for a fastener. In most cases, the hole-guides 210 will begin as knock-outs: thinned or frangible portions of the sidewall 212 of the main compartment 202 that will create an opening when a fastener knocks them out. However, depending on the thickness of the sidewall 212, it may not be necessary to make that portion of the sidewall thinner or frangible; a fastener may simply be driven through it. For example, in some cases, the fastener may be of a self-drilling type; in other cases, a drill may be used to create an opening before a fastener is inserted.

Figure 9:
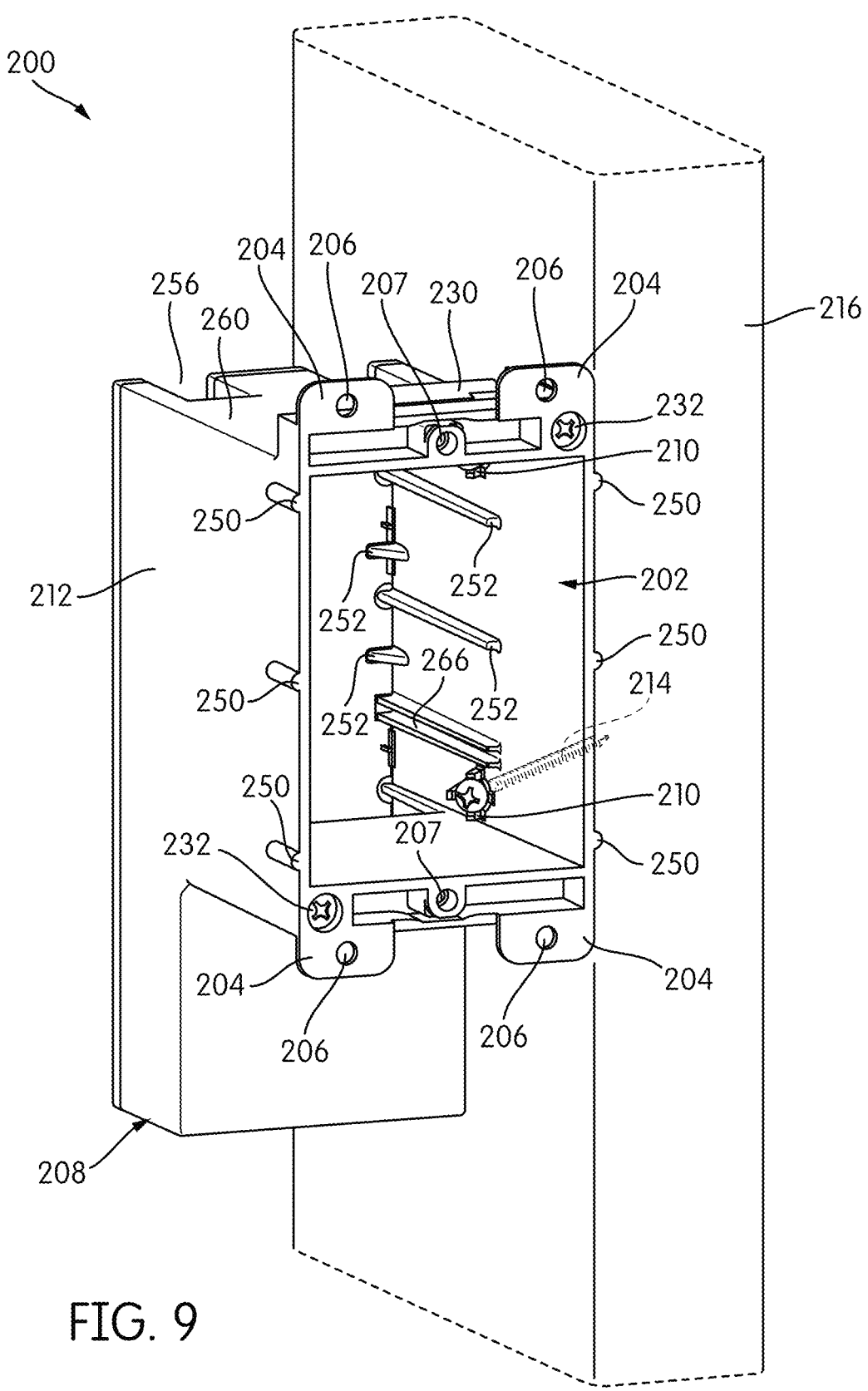
FIG. 9 is a perspective view illustrating the gang box of FIG. 7 mounted to a joist in a new-construction installation.

With a set of hole-guides 210 along each of opposite left and right sidewalls 212 of the main compartment, the gang box 200 may be secured either to a left-adjacent joist or to a right-adjacent joist. The angular cant of the hole-guides 210 means that the securing fasteners will extend laterally outward and will be driven rearward into the joist. FIG. 9 is an example of this, a perspective view showing a gang box 200 with fasteners 214 extending through the hole-guides 210 to secure the gang box 200 to a joist 216 that is right-adjacent. (Here, the terms "left" and "right" are used with respect to the coordinate system of the figures; the right-adjacent joist 216 is on the right side of FIG. 9.) The angular cant of the hole-guides 210 should be sufficient to ensure that a fastener 214 inserted into it has enough outward extent to bite into the joist 216 but should also be chosen so that a drill or other tool inserted into the main compartment 202 has a viable angle of attack and sufficient clearance to drive the fastener 210. Additionally, while the hole-guides 210 should be sufficiently raised relative to the interior surface of the main compartment 202 to provide a useful guide for inserting the fastener 214, they should not extend into the main compartment 202 to such an extent that they would block the insertion of a switch or control into the main compartment 202.

This description assumes that to secure the gang box 200 to the joist 216, two fasteners 214 are used, one in each hole-guide 210 on one side of the main compartment 202. However, it may not be necessary to use both hole-guides 210. If one fastener 214 inserted into one hole-guide 210 is sufficient to secure the gang box 200, then one fastener 214 may be used.

For retrofits (i.e., old work), the gang box 200 would typically be secured within an opening in the drywall or plaster that comprises the outer layer of a wall, rather than to a joist 216. For this purpose, the gang box 200 has paddle structures 230 attached to the top corner and the opposite bottom corner of the main compartment 202. However, unlike the paddle 30 described above, the paddle structures 230 are not rigidly attached to the gang box 200. Rather, as shown in FIG. 8, the paddle structures 230 are carried such that they initially lie flat against the outer surfaces of the main compartment 202. When needed, they can be rotated into their vertical, operational positions.

Figure 10:
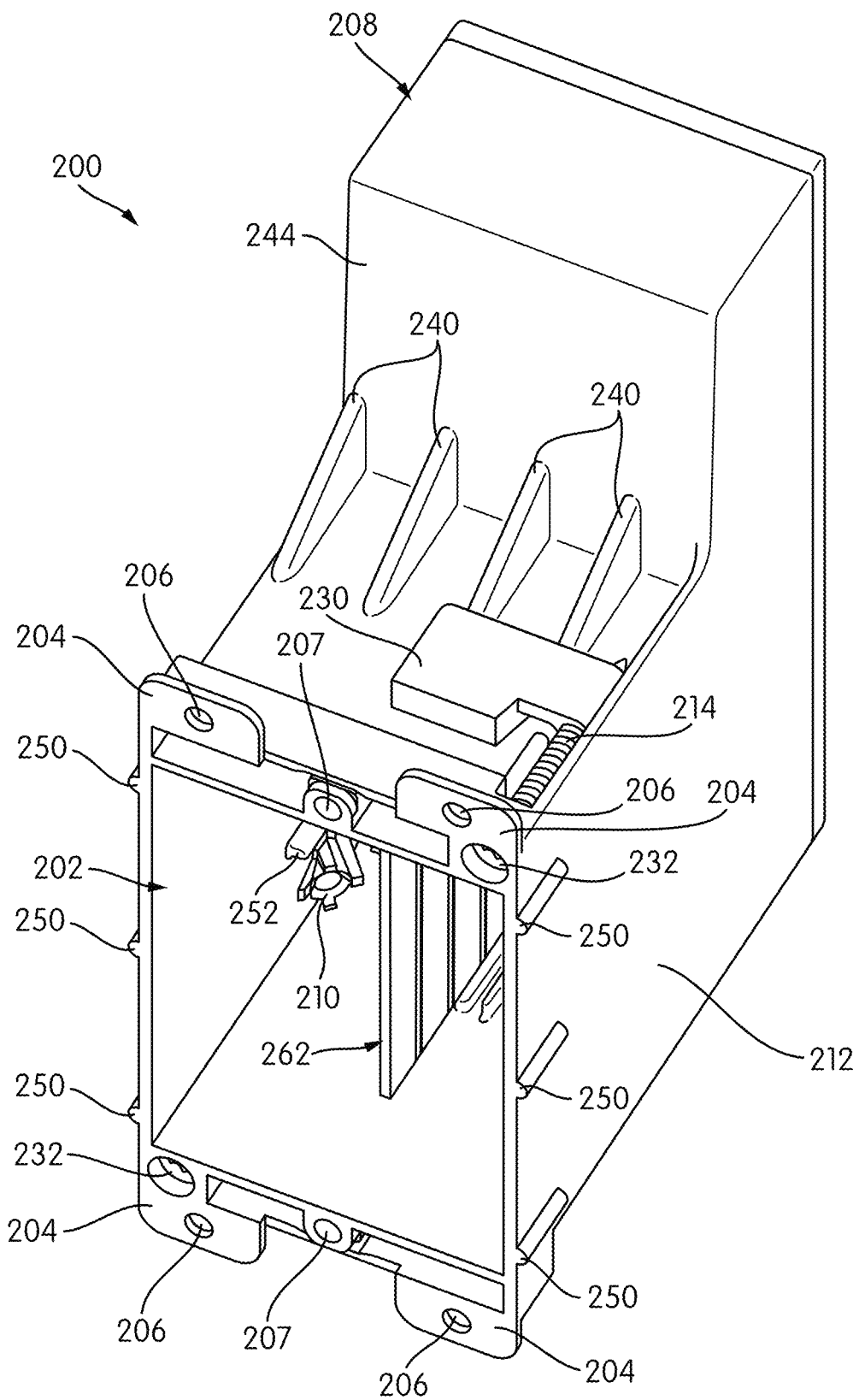
FIG. 10 is a bottom perspective view of the gang box of FIG. 7, illustrating rotatable installation paddle structure in a stowed position.

FIG. 10 is a bottom perspective view of the gang box 200, illustrating the bottom surface of the main compartment 202 and the transition into the lower compartment 208. The paddle structure 230 is carried by a screw 232 that inserts into and through an opening 234 provided in the flange 204 adjacent the opening of the main compartment 202. When the gang box 200 is used in new construction, the paddle structure 230 may be rotated down to rest against the top of the gang box 200, so as not to interfere with the joist mounting shown in FIG. 9. However, when the paddle structure 230 is to be used for mounting, the screw 232 can be rotated to rotate the paddle structure 230 from its horizontal position to a vertical position. These may be considered to be "stowed" and "deployed" positions of the paddle structures 230. The direction of rotation is illustrated by arrows in the front elevational view of FIG. 8. The arrangement of the paddle structure 230 on the top corner of the main compartment 202 is essentially the same. In some cases, the screw 232 may be locked in the opening 234, so that it can be rotated, but not removed from the opening 234.

In typical new-work gang boxes, structure allowing a fastener to be inserted into a joist is provided along the top of the gang box. The position of the hole-guides 210 within the main compartment 202 leaves the top of the gang box 200 clear for the paddle structure 230.

FIG. 10 illustrates other details of the construction of the gang box 200, including a set of four generally triangular stiffening ribs 240 that arise from and are spaced across the lower exterior surface 242 of the main compartment 202 and extend to the forward exterior vertical surface 244 of the lower compartment 208. The stiffening ribs 240 provide additional structural support at the junction between the main compartment 202 and the lower compartment 208.

Figure 11:
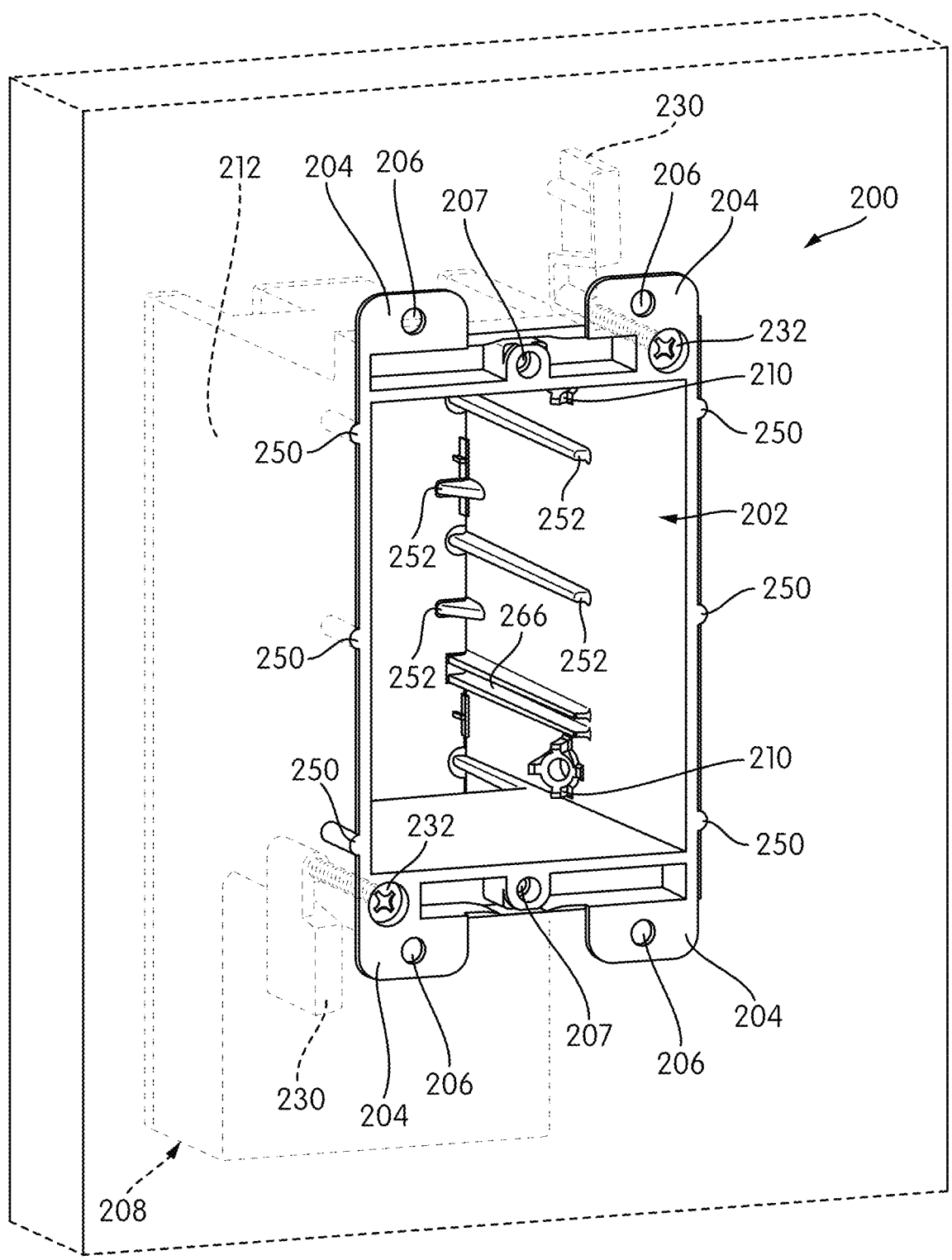
FIG. 11 is a perspective view illustrating the gang box of FIG. 7 mounted to an outer wall layer in a retrofit installation.

FIG. 11 is a perspective view of a gang box 200 installed in drywall 250 with the paddle structures 230 (shown in phantom lines) in vertical positions providing securement. The paddle structures 230 essentially create a slot or groove between the front face of the paddle structures 230 and the rear faces of the flanges 204, and the drywall 250 rests in those grooves. (Here, the drywall 250 is representative of any distinct outer wall layer. In other embodiments, that outer wall layer may be lath-and-plaster or some other sort of material, like cement board, plywood, etc.) In FIG. 11, the hole-guides 210 are unused.

The gang box 200 may include additional features that help with securement in retrofit scenarios like that shown in FIG. 11. For example, the illustrated embodiment includes outwardly-extending ribs 250 on side exterior surfaces of the main compartment 202. The ribs 250 are semi-cylindrical in shape and extend rearwardly from the front face of the main compartment a short distance. These ribs 250, may help to wedge the gang box 200 into place within the drywall 250. That is, an opening for the gang box 200 could be cut to a size that is equal to or just larger than the outer dimensions of the main compartment 202. The ribs 250 would extend outwardly to dimensions that are equal to or just larger than those of the opening, so as to ensure a tight fit.

As can be seen in FIGS. 7-11, the interior sidewalls of the main compartment 202 include a number of stiffening ribs 252 extending in a front-to-back horizontal orientation along its interior sidewalls. Additional stiffening and bracing structure 254, in the form of generally triangular ribs, connects the respective sidewalls and the back of the main compartment 202.

In addition to features allowing it to be used for either new construction or retrofits, the gang box 200 has a different mechanism for dividing and electrically isolating portions of the main and lower compartments 202, 208 than the gang boxes 10, 100 described above. It also has a different arrangement of openings for high- and low-voltage wiring.

In the gang boxes 10, 100 described above, high-voltage wires enter at the top of the gang box 10, 100 and low-voltage wires exit at the bottom of the main compartment 14. By contrast, in the gang box 200, flap-protected openings 256, 258 are provided in left and right portions of the top 260, allowing high voltage and low voltage wiring to transit through the top 260. (The flap-protected openings 256, 258 are best seen in FIG. 8.

Additionally, in order to provide the separation between high and low voltage required by at least some safety codes, the main compartment 202 is constructed and arranged to be divided by a vertical divider. As can be seen particularly in the front elevational view of FIG. 8, as well as in the exploded view of FIG. 12, the gang box 200 actually has two dividers 262, 264. Specifically, a horizontal divider 264 inserts into a pair of aligned horizontal slots 267 that extend outwardly from the lower interior sidewalls of the main compartment 202. The horizontal divider 264 serves to provide at least a partial isolation or division between the main compartment 202 and the lower compartment 208.

Figure 12:
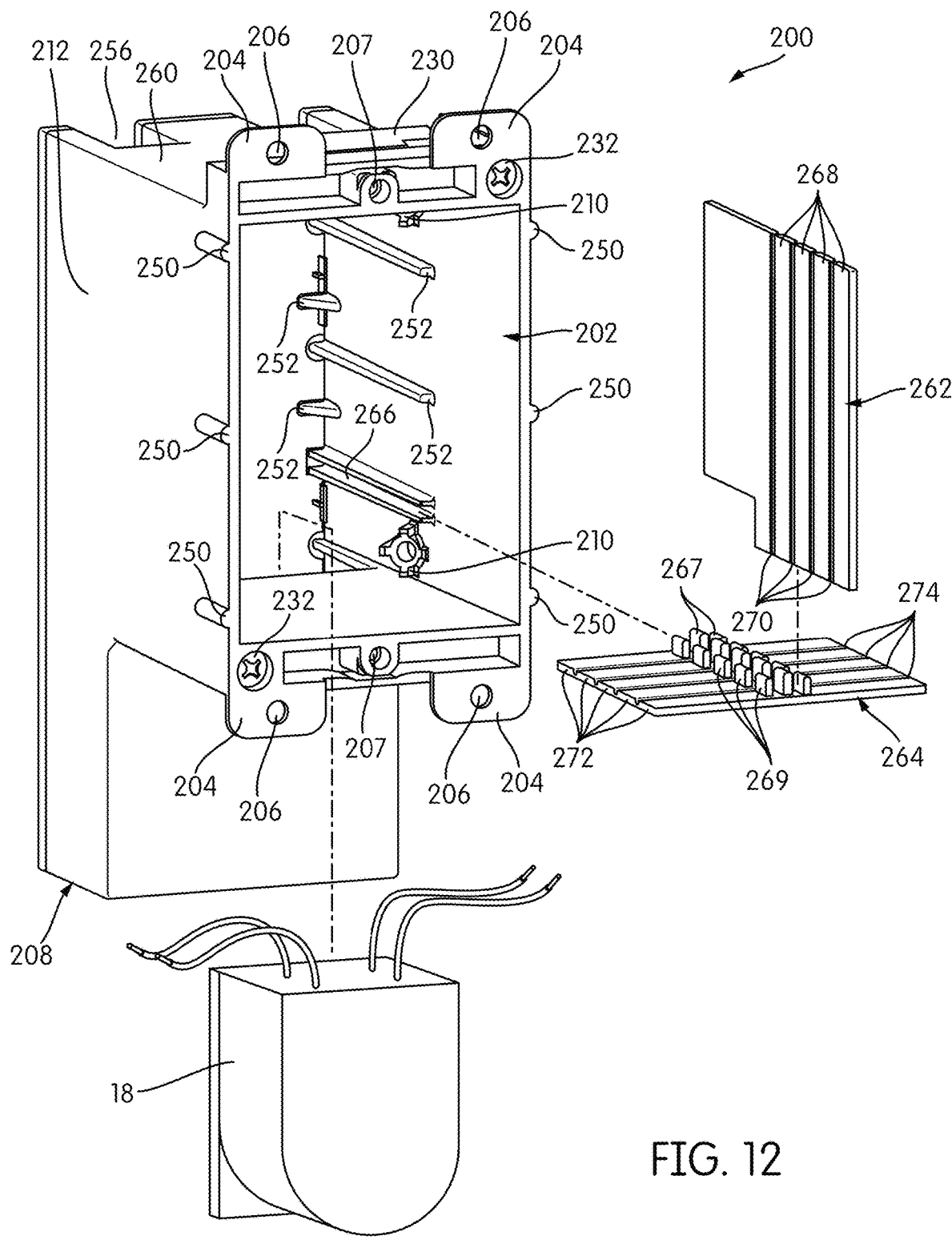
FIG. 12 is an exploded perspective view of the gang box of FIG. 7, illustrating the installation of a driver and compartment dividers.

A vertical divider 262 is carried at its bottom end by the horizontal divider 264 and inserts into one of two slots 267 defined by raised structures 269 that arise from the horizontal divider 264. As can be seen in FIG. 12, both the horizontal divider 264 and the vertical divider 262 are at least partially divided into sections 268, 272 by frangible lines 270, 272. More specifically, in the illustrated embodiment, the horizontal divider 264 is entirely comprised of sections 272 connected by frangible break lines 274, while nearly the majority of the vertical divider 262 is divided into section 268 by frangible break lines 270. The raised structures 269 on the horizontal divider 264 that define the slots 267 for the vertical divider 262 are themselves discontinuous and interrupted, with each of the raised structures 269 extending only over a single one of the sections 272 that comprise the horizontal divider 264, so that their presence does not prevent the sections 272 from being broken off along the frangible lines 274.

This construction allows the dividers 262, 264 to be altered in depth to accommodate switches and controls of various depths. The vertical divider 262 in this embodiment also includes a rectangular cut-out 276 at the bottom of the rearward portion.

The change in ingress and egress of wires may make it more convenient to run wires into the gang box 200, or it may make it easier to manage wire runs entering and leaving the gang box 200. The dividers 262, 264 and the vertical division of the rear of the main compartment 202 into high-voltage and low-voltage compartments follows the location of the flap-protected openings 256, 258 in the top of the main compartment 202.

As was described above, the gang box 200 has mounting structures 210, 230 that allow it to be used in both old-work and new-work scenarios. These "dual use" features may be used on much broader range of gang boxes, and not just in gang boxes 200 with lower compartments 208. In general, dual-use mounting structures 210, 230 may be included on any standard gang box. Such a gang box would appear much like the gang box 200 of FIG. 7, albeit without a lower compartment 208.

Gang boxes 10, 100, 200 according to embodiments of the invention may be made of a variety of materials, typically including metals and plastics. If a gang box 10 is made of a plastic, typically, the plastic will be adapted and rated to handle flames. For example, the plastic may be rated as 5 VA according to the UL 94 standard, which is harmonized with a number of international standards.

This description uses the word "about." When that word is used in association with a number or a numerical range, it means that that number or range may vary so long as the described effect or end result does not change. If it cannot be determined what range would not cause the described effect or end result to change, the word "about" should be construed to mean ±10%.

While the invention has been described with respect to certain embodiments, the description is intended to be exemplary, rather than limiting. Modifications and changes may be made within the scope of the invention, which is defined by the appended claims.

What is claimed is:

1. An electrical gang box, comprising:
   a main compartment having a front, a back, opposite sidewalls extending between the front and the back, and a rectilinear front opening at the front, the main compartment being sized and adapted to accept an electrical control;
   paddle structure coupled rotatably to an outer portion of the main compartment such that it is movable between stowed and deployed positions; and
   hole-guides positioned in the opposite sidewalls of the main compartment, each of the hole-guides comprising a raised, angularly-canted opening or knock-out in a thickness of one of the opposite sidewalls.

2. The electrical gang box of claim 1, further comprising:
a lower compartment extending below and depending from the main compartment, the lower compartment having sidewalls contiguous with the opposite sidewalls of the main compartment and a lesser depth than the main compartment, such that the lower compartment is set back from the front of the main compartment, the lower compartment open to the main compartment along at least substantially the entirety of an upper extent thereof.

3. The electrical gang box of claim 2, further comprising:
a horizontal divider removably insertable into sets of vertically-aligned slots along interior surfaces of the opposite sidewalls of the main compartment; and
a vertical divider carried, at least in part, by the horizontal divider and extending from the horizontal divider to an interior top surface of the main compartment.

4. The electrical gang box of claim 3, wherein at least a portion of the horizontal divider and at least a portion of the vertical divider are divided into sections by frangible break lines.

5. The electrical gang box of claim 3, further comprising a wire ingress opening and a wire egress opening spaced from one another at respective sides of a top of the main compartment.

6. The electrical gang box of claim 5, wherein the wire ingress opening includes a first flap and the wire egress opening includes a second flap.

7. The electrical gang box of claim 1, wherein the paddle structure is coupled rotatably to the outer portion of the main compartment by a rotatable fastener inserted into an opening in the gang box.

8. The electrical gang box of claim 7, wherein the opening is in a flange adjacent the rectilinear front opening of the main compartment.

9. The electrical gang box of claim 1, wherein the paddle structure comprises a first paddle structure positioned at an upper exterior corner of the main compartment and a second paddle structure positioned at a lower exterior corner of the main compartment.

10. The electrical gang box of claim 9, wherein the upper, exterior corner and the lower exterior corner are opposite corners.

11. The electrical gang box of claim 1, wherein the hole-guides comprise sets of hole-guides positioned on the opposite sidewalls of the main compartment, ones of each of the sets of hole-guides being vertically spaced from one another.

12. The electrical gang box of claim 1, wherein the hole guides are positioned and canted such that fasteners extending through the hole guides will extend outwardly and rearwardly from the opposite sidewalls of the main compartment.

13. An electrical gang box, comprising:
a main compartment having a front, a back, and a rectilinear front opening at the front, the main compartment being sized and adapted to accept an electrical control;
a lower compartment extending below and depending from the main compartment, the lower compartment having contiguous sidewalls with the main compartment and a lesser depth than the main compartment, such that the lower compartment is set back from the front of the main compartment, the lower compartment open to the main compartment along at least substantially the entirety of an upper extent thereof;
a horizontal divider removably insertable into sets of vertically-aligned slots along opposite interior sidewalls of the main compartment; and
a vertical divider carried, at least in part, by the horizontal divider and extending from the horizontal divider to an interior top surface of the main compartment.

14. The electrical gang box of claim 13, wherein at least a portion of the horizontal divider and at least a portion of the vertical divider are divided into sections by frangible break lines.

15. The electrical gang box of claim 13, further comprising a wire ingress opening and a wire egress opening spaced from one another at respective sides of a top of the main compartment.

16. The electrical gang box of claim 15, wherein the wire ingress opening includes a first flap and the wire egress opening includes a second flap.

17. An electrical gang box, comprising:
a main compartment having a front, a back, and a rectilinear front opening at the front, the main compartment being sized and adapted to accept an electrical control;
a lower compartment extending below and depending from the main compartment, the lower compartment having contiguous sidewalls with the main compartment and a lesser depth than the main compartment, such that the lower compartment is set back from the front of the main compartment, the lower compartment open to the main compartment along at least substantially the entirety of an upper extent thereof;
paddle structure coupled to an outer portion of the main compartment;
hole-guides positioned within the main compartment;
a horizontal divider removably insertable into sets of vertically-aligned slots along opposite interior sidewalls of the main compartment; and
a vertical divider carried, at least in part, by the horizontal divider and extending from the horizontal divider to an interior top surface of the main compartment.

18. The electrical gang box of claim 17, wherein the paddle structure is coupled rotatably to the outer portion of the main compartment by a rotatable fastener inserted into an opening in the gang box.

19. The electrical gang box of claim 18, wherein the paddle structure comprises a first paddle structure positioned at an upper exterior corner of the main compartment and a second paddle structure positioned at a lower exterior corner of the main compartment.

20. The electrical gang box of claim 17, wherein at least a portion of the horizontal divider and at least a portion of the vertical divider are divided into sections by frangible break lines.

21. The electrical gang box of claim 17, further comprising a wire ingress opening and a wire egress opening spaced from one another at respective sides of a top of the main compartment.

* * * * *